US012616181B1

(12) United States Patent     (10) Patent No.:   US 12,616,181 B1

Davis                                   (45) Date of Patent:         May 5, 2026

---

(54) COLLAPSIBLE UMBRELLA FISHING RIG APPARATUS AND METHOD OF USE

(71) Applicant: Ronald T. Davis, Lancaster, CA (US)

(72) Inventor: Ronald T. Davis, Lancaster, CA (US)

( * ) Notice: Subject to any disclaimer, the term of this patent is extended or adjusted under 35 U.S.C. 154(b) by 0 days.

(21) Appl. No.: 19/279,510

(22) Filed: Jul. 24, 2025

Related U.S. Application Data

(60) Provisional application No. 63/676,000, filed on Jul. 26, 2024.

(51) Int. Cl.
     *A01K 91/053*       (2006.01)

(52) U.S. Cl.
     CPC ................................. *A01K 91/053* (2013.01)

(58) Field of Classification Search
     CPC .............................. A01K 91/053; A01K 91/08
     USPC ........................................................ 43/42.74
     See application file for complete search history.

(56) References Cited

U.S. PATENT DOCUMENTS

| | | | | | |
|---|---|---|---|---|---|
| 14,587 | A | | 4/1856 | Smith | |
| 748,655 | A | * | 1/1904 | Rohrer | ..................... A45B 9/00 |
| | | | | | 135/65 |
| 1,352,979 | A | | 9/1920 | Lawrence | |
| 1,463,062 | A | * | 7/1923 | Roberts | .................. A01K 73/12 |
| | | | | | 43/105 |
| 1,782,010 | A | | 11/1930 | Meyer | |
| 2,145,992 | A | * | 2/1939 | Parker | .................... A01K 91/04 |
| | | | | | 43/42.74 |
| 2,157,477 | A | * | 5/1939 | Bulow | ................. A01K 91/053 |
| | | | | | 43/43.15 |
| 2,196,472 | A | * | 4/1940 | Moriarty | .............. A01K 91/053 |
| | | | | | 43/42.74 |
| 2,462,290 | A | | 2/1949 | Sauvey | |
| 2,725,842 | A | * | 12/1955 | Norris | ................... B63B 21/243 |
| | | | | | 43/43.11 |
| 3,067,538 | A | | 12/1962 | Hines | |
| 3,270,458 | A | | 9/1966 | McAfee | |
| 3,646,700 | A | | 3/1972 | Pond | |

(Continued)

FOREIGN PATENT DOCUMENTS

| | | |
|---|---|---|
| KR | 20130110334 A | 10/2013 |

OTHER PUBLICATIONS

"How to Assemble the Atlas Rig" Feb. 10, 2018 Tackle Builders blog post, https://www.tacklebuilders.com/how-to-assemble-the-atlas-rig/ accessed on Jul. 23, 2025.

(Continued)

*Primary Examiner* — Morgan T Jordan

(74) *Attorney, Agent, or Firm* — Master Key IP, LLP; Jeromye V. Sartain

(57) ABSTRACT

An umbrella fishing rig apparatus including a rig body having an upper end and an opposite lower end and a central axis therethrough and comprising a spacer and a support, the spacer having a spacer upper surface and an opposite spacer lower surface, the spacer lower surface having formed therein radially spaced apart downwardly-opening spacer arm bent end channels communicating with radially spaced apart outwardly-opening spacer arm slots formed in the spacer intersecting the spacer upper and lower surfaces, and arms operably engaged with the rig body, each arm being elongate and formed having a proximal bent end configured to pivotally seat within the respective spacer arm bent end channel.

21 Claims, 11 Drawing Sheets

(56)  References Cited

U.S. PATENT DOCUMENTS

| | | | | |
|---|---|---|---|---|
| 4,608,571 | A * | 8/1986 | Luly | H01Q 15/161 |
| | | | | 343/915 |
| 4,627,210 | A * | 12/1986 | Beaulieu | A45B 25/10 |
| | | | | 135/147 |
| 4,641,395 | A * | 2/1987 | Banks | A01K 91/08 |
| | | | | 248/514 |
| 5,069,572 | A * | 12/1991 | Niksic | F16B 7/0486 |
| | | | | 135/147 |
| 5,085,239 | A * | 2/1992 | Chin-Hung | A45B 25/18 |
| | | | | 135/31 |
| 5,193,566 | A * | 3/1993 | Chen | A45B 25/02 |
| | | | | 135/31 |
| 6,314,976 | B1 * | 11/2001 | Clarke | A45B 25/22 |
| | | | | 403/217 |
| 6,386,214 | B1 * | 5/2002 | Clarke | A45B 25/14 |
| | | | | 248/533 |
| 6,397,867 | B2 * | 6/2002 | You | A45B 25/22 |
| | | | | 135/33.7 |
| 6,493,985 | B2 | 12/2002 | Matches | |
| 7,178,535 | B2 * | 2/2007 | Eder | A45B 25/10 |
| | | | | 135/30 |
| 7,401,617 | B2 * | 7/2008 | Gobel | A45B 25/10 |
| | | | | 135/28 |
| 7,412,795 | B2 | 8/2008 | Glynn et al. | |
| 7,891,367 | B2 * | 2/2011 | Ma | A45B 25/02 |
| | | | | 135/19.5 |
| 8,061,375 | B2 * | 11/2011 | Ma | A45B 25/02 |
| | | | | 403/171 |
| 8,448,656 | B2 * | 5/2013 | Choi | E04H 15/42 |
| | | | | 135/147 |
| 8,572,887 | B2 | 11/2013 | Adelman | |
| 9,078,497 | B2 * | 7/2015 | Ma | A45B 25/10 |
| 9,591,840 | B2 | 3/2017 | LeHew | |
| 10,041,271 | B2 * | 8/2018 | Jin | E04H 15/425 |
| 11,219,200 | B2 | 1/2022 | Teklinski | |
| 11,633,024 | B1 * | 4/2023 | Arnold | A45B 23/00 |
| | | | | 135/88.05 |
| D1,010,766 | S | 1/2024 | Xyong | |
| 12,317,976 | B2 * | 6/2025 | Ma | A45B 25/10 |
| 2003/0019512 | A1 * | 1/2003 | You | A45B 25/16 |
| | | | | 135/22 |
| 2003/0159726 | A1 * | 8/2003 | You | A45B 25/02 |
| | | | | 135/29 |
| 2003/0208948 | A1 * | 11/2003 | Higgins | A01K 91/053 |
| | | | | 43/42.74 |
| 2005/0050790 | A1 | 3/2005 | Higgins | |
| 2012/0073182 | A1 | 3/2012 | Poss | |
| 2015/0181846 | A1 | 7/2015 | Taboada | |
| 2016/0235047 | A1 | 8/2016 | Mirabal | |
| 2018/0077914 | A1 * | 3/2018 | Szoke, Jr. | A01K 85/00 |
| 2019/0200593 | A1 * | 7/2019 | Teklinski | A01K 91/08 |
| 2020/0305402 | A1 | 10/2020 | Xyong | |

OTHER PUBLICATIONS

"Hyper Umbrella Rig . . . Explore the Possibilities" article on Pro Bass, https://www.probass.net/protips/MikeWalker/hyper-umbrella-rig.php.html accessed on Jul. 23, 2025.

* cited by examiner

COLLAPSIBLE UMBRELLA FISHING RIG APPARATUS AND METHOD OF USE

RELATED APPLICATIONS

This non-provisional patent application claims priority pursuant to 35 U.S.C. § 119(e) to and is entitled to the filing date of U.S. Provisional Patent Application Ser. No. 63/676,000 filed Jul. 26, 2024, and entitled "Collapsible Umbrella Fishing Rig Apparatus and Method of Use." The contents of the aforementioned application are incorporated herein by reference.

BACKGROUND

The subject of this patent application relates generally to fishing gear or tackle, and more particularly to umbrella rigs configured for simultaneously fishing with a plurality of baits as by having splayed arms with bait attachment eyes or the like and a central hub allowing the rig to be fastened to and fished, cast, or trolled from a single fishing line.

The following description includes information that may be useful in understanding the present invention. It is not an admission that any of the information provided herein is prior art or relevant to the presently claimed invention, or that any publication specifically or implicitly referenced is prior art.

Applicant hereby incorporates herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, umbrella rigs, as they are currently commonly called, are fishing tackle devices designed to basically support a plurality of fish hooks from a single line. Such umbrella rigs generally have a central axial body and an arrangement of two or more splayed arms extending radially outwardly from the central body, somewhat resembling a crib mobile or the like or the support structure of an umbrella, hence the name "umbrella rig." Each such splayed arm may be configured with one or more eyes, or essentially loops or bends in the arm, which is typically made of metal wire, such as at its end opposite the central body and at an intermediate location along the arm. The idea is to then bait the umbrella rig as by affixing baits of a desired type at the eyes on the various arms, such as swimbaits with hooks at the ends of some or all of the arms and teasers or attractants elsewhere, such that when cast and then reeled in the umbrella rig gives the appearance in the water of a school of baitfish and is thus highly attractive to larger fish. And with the proper configuration of the rig including its baits and possibly additional weights, an angler can fish such an umbrella rig at a variety of depths and in a variety of situations, making it quite versatile and effective for various targets or kinds of fish and fishing.

One downside of umbrella rigs, though, is storage or handling of the rigs out of the water or when not in use, as with the splayed arms in its assembled or "in use" configuration such rigs are quite cumbersome and unwieldy in storage and transport. Accordingly, there have been proposed over the years various configurations of umbrella rigs, or what have also been called "spreaders" and "dredges,"

having arms that are selectively collapsible or removable, or rigs that can be disassembled for storage and reassembled for use. While such earlier versions of umbrella rigs and the like configured for collapsing or disassembly are thus aimed at the same problem of conveniently and effectively transitioning an umbrella rig from a collapsed condition for storage to an expanded condition for use, each has drawbacks or shortcomings in actual practice that previously have not been satisfactorily addressed.

For example, U.S. Pat. No. 1,352,979 to Lawrence entitled "Fishline Spreader" and granted on Sep. 14, 1920 is directed to "a novel line spreader in which the spreader arms are connected to the body in such a way as to permit the arms to be folded together when the device is not in use, thus providing structure which can be put into a small compact space for storage or transportation." How this is achieved in Lawrence, though, is through a clamping two-half body wherein a screw or threaded stud passes axially through one half of the body into the other so as to selectively clamp and secure the selectively splayed spreader arms in place between the two halves. And then when the spreader is to be collapsed, the threaded stud must be unscrewed to allow the arms to again move freely, which then fold into a common plane that is perpendicular to the axis of the two-half body and related threaded stud and so does not allow the overall profile of the spreader to be as reduced when collapsed as it would be if the arms were folded into an arrangement parallel to the central axis of the spreader.

And other commercial umbrella rig products have since followed Lawrence with similar configurations, such as the "Hyper Umbrella Trolling Rig" by Hyper Striper having its splayed arms selectively secured or clamped in their extended positions between two halves of the central body or effectively two clamping surfaces as by a wingnut operably installed on a central threaded shaft or bolt running axially through the rig body and oriented to selectively thread onto the lower exposed end of the bolt and shoulder against the lower half of the body so as to lift or push it into abutting or clamping engagement with the upper half of the body, with the arms again secured therebetween and, like Lawrence, configured to each rotate or fold in a plane perpendicular to the rig's central axis. Moreover, when the wingnut is loosened for collapsing and storing the Hyper umbrella rig, the arms have a tendency to fall out or detach altogether from the rig body, making reassembly and extending and securing the arms for use all the more cumbersome. Fundamentally, the Hyper umbrella rig requires the user to properly orient the arms and the plastic disk to fold and unfold, with each arm having to be in the correct slot, which can be difficult to do while trying to also manipulate the wingnut.

Similarly, the "Atlas Rig" umbrella rig sold by Tackle Builders has a two-half central rig body with an axial bolt passing through the two halves, here tightened from above as by the bolt passing through the upper half of the rig body and threadably engaging the lower half of the rig body so as pull the lower half into clamping engagement with the upper half to again selectively clamp the arms in the desired splayed positions for use. In the Atlas Rig, the arms fold down parallel to the central axis of the rig body and the bolt or away from the line or line attachment and thus the rod and reel and angler, which is disadvantageous in that in use the forces on the arms through resistance as the rig is pulled through the water while being reeled in and of course particularly when a fish is hooked on the rig would be in the direction the arms fold and so would have a tendency to encourage the rig to collapse, particularly if the bolt clamping the two halves was not secured or backed out during use at all, which could then result in damage to the rig or missing or losing a catch.

A particular shortcoming of all such prior art umbrella rig devices that involve clamping two halves of the central rig body together to selectively secure the arms in their splayed "in use" configuration is the need to then screw and unscrew a bolt or nut each time the rig is to be expanded or collapsed at greater hassle and inconvenience as by requiring additional time and potentially even needing a tool. Such threaded clamping rig bodies for arm actuation also have an increased risk of damage or failure of the rig since such threaded parts may become stripped or be lost or just become corroded over time due to use in such wet and even salt water conditions. Accordingly, clamping body umbrella rigs with threaded actuators or means of applying the clamping force have a number of downsides.

Other attempts at selectively collapsible umbrella rigs or spreaders and as an alternative to having to manually screw or unscrew a component to tighten or loosen such clamping surfaces for expanding or collapsing the arms involve various spring-biased mechanisms that, for example, bias the clamping surfaces together but can be overcome by applying a particular force in a particular direction such as by squeezing certain components relative to each other against the spring force to temporarily then free the arms for collapsing or expanding, as by rotating from one position to the other once freed to do so. An example of such an umbrella rig is shown in U.S. Patent Application Publication No. US20050050790A1 to Higgins published on Mar. 10, 2005 and entitled "Collapsible Umbrella Rig" and is directed to such a rig having a relatively complex spring-biased release mechanism having various pressure devices even of varying force or "predetermined rigidity" to suit the intended catch (weight expected) that act against a disc that in turn acts against both the pivot ends of the arms and the housing. Such release mechanism is again purposefully configured with the arms collapsing downwardly or away from the line top end or line attachment end of the rig and thus so that the arms may even collapse (overcome the pressure device) when a relatively larger fish is hooked. Again, such an umbrella rig has relatively more moving parts and complexity and thus is relatively more costly and likely to fail (more potential failure modes).

What is still needed and has heretofore been unavailable is a reliable, convenient, and cost-effective umbrella rig that still allows for selective collapsing of the arms of any number for efficient storage and transport and selective extension of the arms for use. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a new and improved umbrella fishing rig apparatus configured for reliable, convenient, and cost-effective operation in selectively collapsing the arms for efficient storage and transport and selectively extending the arms for use. In at least one embodiment, such an umbrella fishing rig apparatus according to aspects of the present invention comprises a central rig body and a plurality of elongate arms extending from the rig body in a splayed arrangement, with each arm configured to be selectively shiftable or pivotable between a somewhat radially-outwardly extending position as for use and a somewhat axial or axially-aligned position as for storage without the need for any tools or unscrewing any fasteners, unclamping any mechanisms, or any disassembly of the apparatus.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
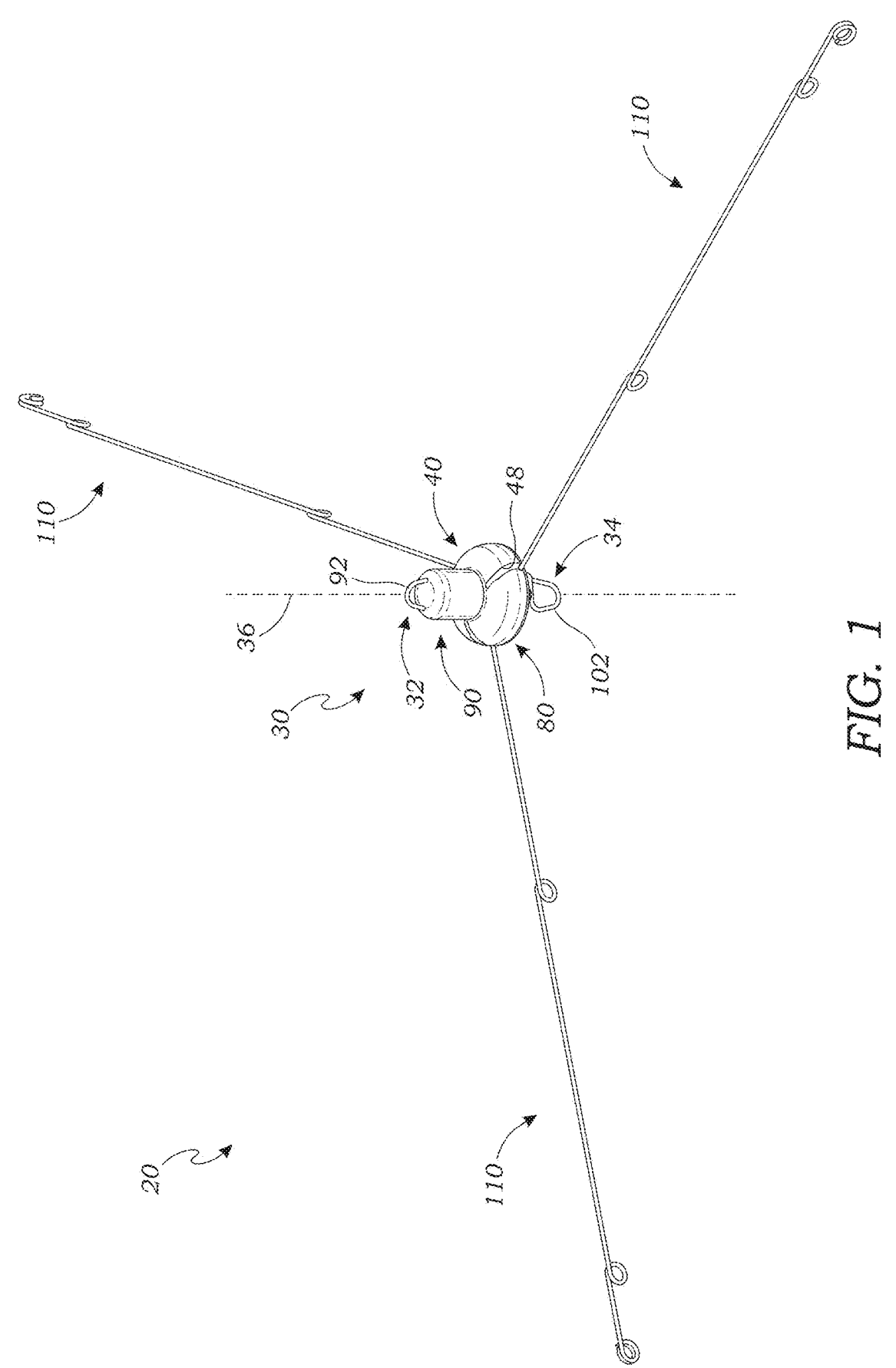
FIG. 1 is a perspective view of an exemplary umbrella fishing rig apparatus in a first operational mode, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of any appended claims.

Figure 2:
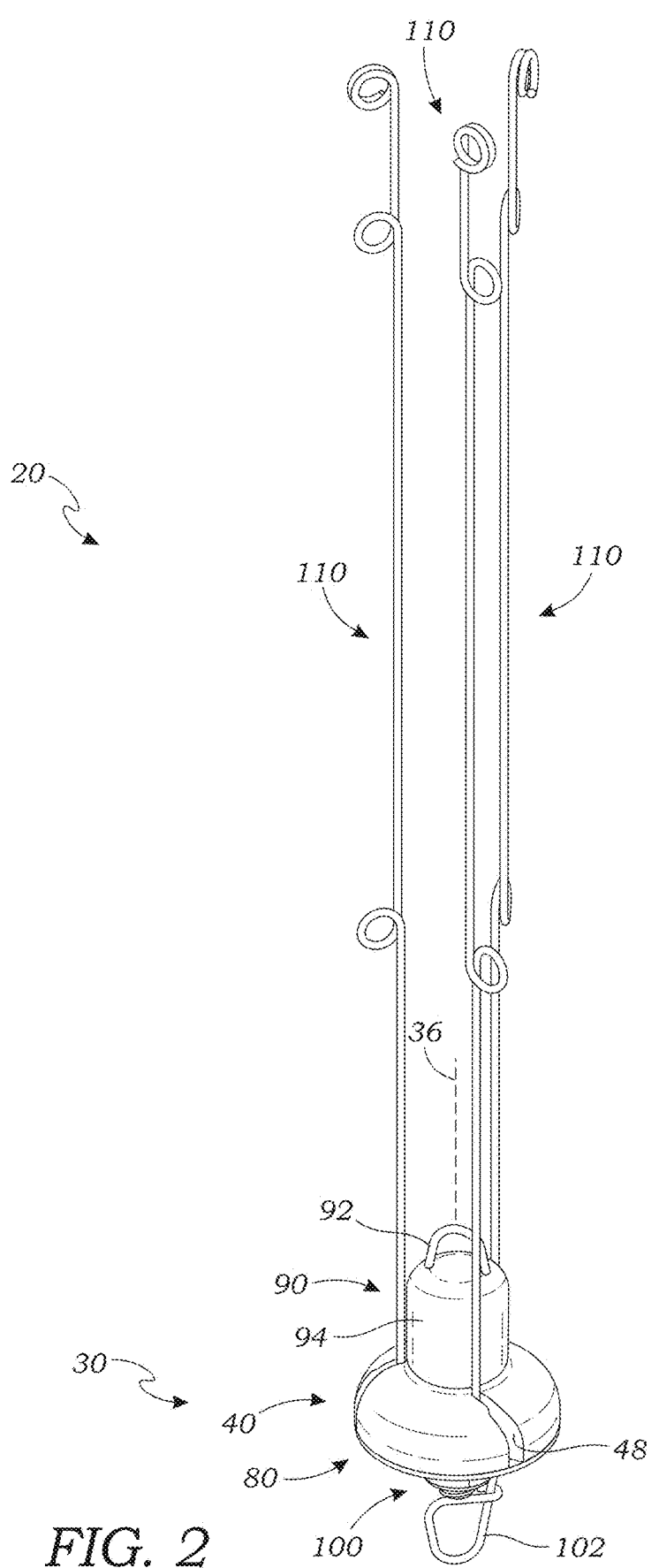
FIG. 2 is an enlarged perspective view thereof in a second operational mode, in accordance with at least one embodiment.

Referring first to FIGS. 1 and 2, there are shown perspective views of an exemplary embodiment of an umbrella fishing rig apparatus 20 according to aspects of the present invention. The apparatus 20 generally comprises, in the exemplary embodiment, a central rig body 30 and a plurality of elongate arms 110 extending from the rig body 30 in a splayed arrangement, with each arm 110 configured to be selectively shiftable or pivotable between a somewhat radially-outwardly extending position as for use of the apparatus 20 in a first operational mode as shown in FIG. 1 and a somewhat axial or axially-aligned position as for storage of the apparatus 20 in a second operational mode as shown in FIG. 2, which it will be appreciated is much more compact for convenient placement in a tackle box or the like. The rig body 30 itself comprises at least a spacer 40, a support 80, and a bolt 90 and nut 100 holding the spacer 40 and support 80 in place and thus assembling the rig apparatus 20 as shown with the arms 110 operably retained within the rig body 30 between the spacer 40 and the support 80, more about which is said below in connection with FIGS. 3 and 4. As a threshold matter, it is noted that while in the exemplary embodiments a conventional bolt 90 and nut 100 are shown and described as the means for assembling at least the spacer 40 and support 80 together in forming the rig body 30, the invention is not so limited, and any means or device for assembly or operably fastening together of such components, whether now known or later developed, may be employed in an umbrella rig apparatus 20 according to aspects of the present invention without departing from its spirit and scope. The upper end 32 of the rig body 30 in the direction of any fishing line and rod (not shown) that is operably connected to the apparatus 20 in or for use is defined by or is associated with the head 94 of the bolt 90 where a bolt loop 92 is configured for selectively tying or affixing any such fishing line or the like, while the opposite lower end 34 of the rig body 30 in the direction opposite of any fishing line connected to the apparatus 20 is defined by or associated with the nut 100 and any nut loop 102 provided thereon or therewith for selectively tying or affixing any bait (not shown). A central axis 36 of the rig body 30 thus passes substantially centrally through the bolt 90, spacer 40, support 80, and nut 100. Splayed about the central axis 36 and oriented again somewhat radially-outwardly are radially spaced-apart arm slots 48 formed in the spacer 40 from which the arms 110 extend and through which the arms 110 are selectively shiftable or pivotable. In the illustrated embodiment with such an umbrella fishing rig apparatus 20 having three arms 110, it will be appreciated that the arms 110 and any related features such as the arm slots 48 are thus radially spaced or angularly offset from one another about the spacer 40 by approximately one hundred twenty degrees (120°). Those skilled in the art will appreciate that when the arms 110 are in their extended position for use as shown in FIG. 1 they each abut the support 80 at the base of the respective spacer arm slots 48 thus stabilizing the arms 110 in their radially-outward positions and preventing further downward movement of the arms 110 in the direction of the lower end 34 of the rig body 30, such as when the arms 110 are under load during fishing, and then when the apparatus 20 is no longer in use and is to be configured for storage the arms 110 are simply shifted or pivoted upwardly within the respective spacer arm slots 48 away from the support 80 and the lower end 34 of the rig body 30 and in the direction of the bolt head 94 at the upper end 32 of the rig body 30 thereby bringing the arms 110 into a somewhat radially-offset axial arrangement spaced about the spacer 40 generally parallel to each other and the central axis 36 of the rig body 30, though not necessarily so, which again renders the apparatus 20 much smaller than in its expanded configuration in terms of its overall profile or "foot print" for convenience in storage. And then to reconfigure the apparatus 20 for use the arms 110 are once again simply folded down toward the lower end 34 of the rig body 30 as by pivoting each one out away from the central axis 36 until it again abuts the support 80 at the bottom of the respective spacer arm slot 48. Essentially, the arms 110 snap down in their splayed positions due to the geometry or features of the spacer arm slots 48 and are simply unlatched by the user when folding the arms 110 up for storage. It will be further appreciated, then, that such movement of the umbrella rig apparatus 20 from or between its storage and use configurations is accomplished without the use of any tools or unscrewing any fasteners, unclamping any mechanisms, or the like or of course any disassembly of the apparatus 20 and furthermore the arms 110 at no point detaching or being detachable from the rig body 30 even as the umbrella fishing rig apparatus 20 according to aspects of the invention is conveniently manually shifted between its storage and use configurations or operational modes. As such, those skilled in the art will appreciate that such an umbrella fishing rig apparatus 20 has numerous advantages in construction and use.

Figure 3:
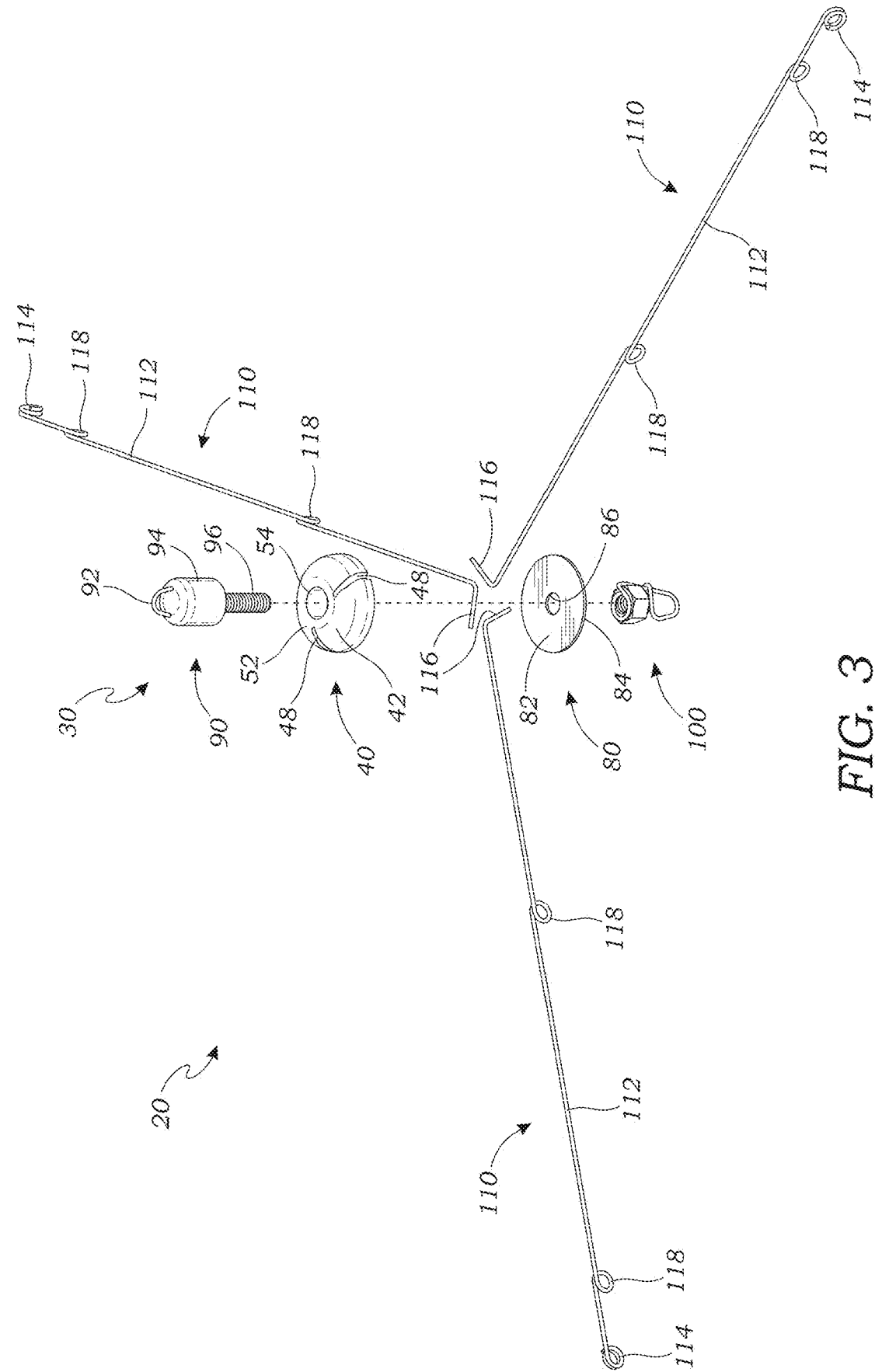
FIG. 3 is an exploded perspective view thereof, in accordance with at least one embodiment.
Figure 4:
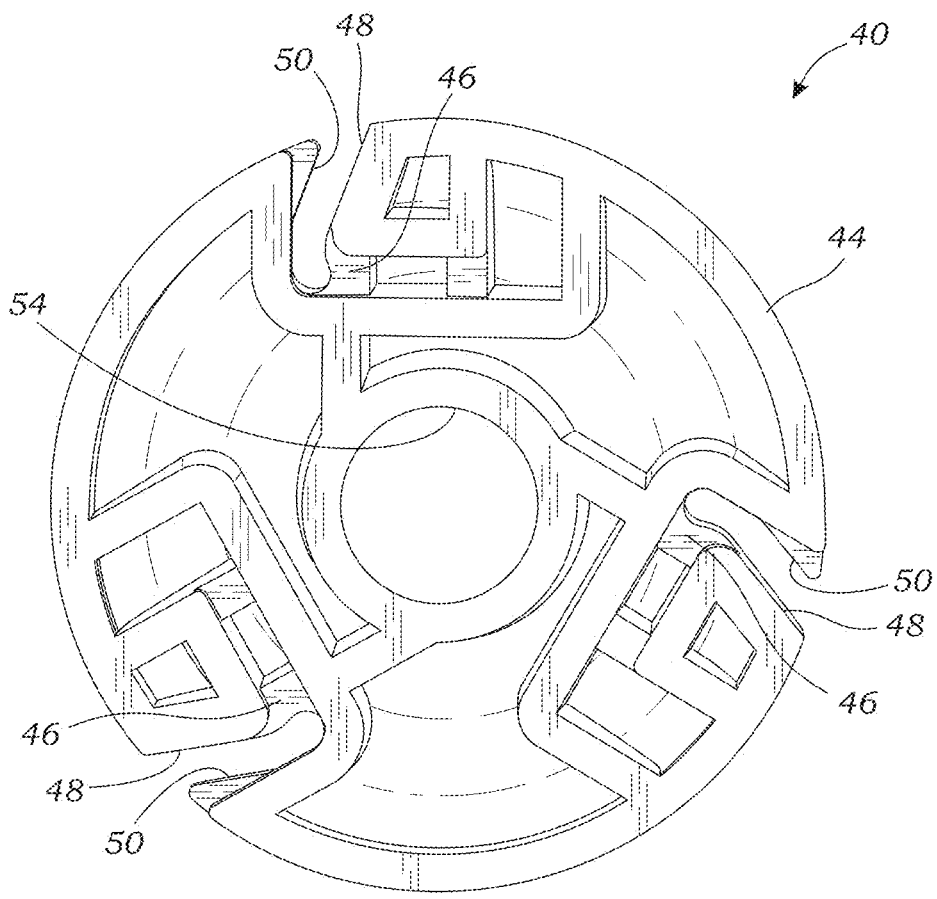
FIG. 4 is an enlarged bottom perspective view of the spacer thereof, in accordance with at least one embodiment.

In a bit more detail now with reference to FIGS. 3 and 4, it can be seen once again that the exemplary rig body 30 of the umbrella fishing rig apparatus 20 according to aspects of the present invention includes an upper spacer 40 and a lower support 80 that in this illustrative embodiment are held together via a bolt 90 and related nut 100 threadably engaged on the shaft 96 of the bolt 90 so as to operably assemble the rig body 30 with the splayed arms 110 pivotally secured within the rig body 30 as shown in FIGS. 1 and 2. The spacer 40 has an upper surface 42 and an opposite lower surface 44 and a spacer through-hole 54 communicating therebetween and similarly the support 80 has an upper surface 82 and an opposite lower surface 84 and a support through-hole 86 communicating therebetween so as to allow for passage of the bolt shaft 96 through both the spacer 40 and the support 80 via the respective through-holes 54, 86, with the exemplary spacer 40 further formed centrally on its otherwise curved or dome-like upper surface 42 about the spacer through-hole 54 with a substantially flat or planar shoulder surface 52 for the bolt head 94 to shoulder against, with the nut 100 simply shouldering against the substantially planar support lower surface 84, though it will again be appreciated that a variety of other fasteners or fastening means for assembling the spacer 40 and support 80 together in forming the rig body 30 so as to operably retain the legs 110 thereon are possible according to aspects of the present invention without departing from its spirit and scope, whether now known or later developed, such that the threaded bolt 90 and nut 100 and related spacer and support through-holes 54, 86 and other such features of the spacer 40 and support 80 accommodating the bolt 90 and nut 100 are to be understood as illustrative and non-limiting. Furthermore, the bolt loop 92 may be formed integrally with the bolt head 94 or may be formed separately and installed on or adjacent to the bolt head 94 as part of assembling the rig body 30, and likewise the nut loop 102 may be formed integrally with the nut 100 or may be formed separately and installed on or adjacent to the nut 100 in conjunction with the bolt 90 again as part of assembling the rig body 30. Once more, each radially-extending spacer arm slot 48 intersects and communicates between the spacer upper and lower surfaces 42, 44 so as to allow for the full range of motion of the arms 110 as shown and described in connection with FIGS. 1 and 2. As best seen in FIG. 3, each arm 110 is generally configured as or formed from an elongate wire 112 having at least a terminal eye 114 at its free end and optionally one or more intermediate eye(s) 118 each for selectively attaching bait (not shown) to the arm 110, though it will be appreciated that crimped attachment points or other features may be employed or formed on or in the wire 112 for bait attachment, such that the eyes 114, 118 are to be understood as merely illustrative, each arm 110 further having an opposite bent end 116 that is configured for operable pivotal engagement within the rig body 30, here between the spacer 40 and the support 80, so as to effectively form a hinge for each arm 110. As shown in FIG. 4, the lower surface 44 of the spacer 40 is particularly formed having radially-offset arm bent end channels 46 that are oriented generally in the plane of the lower surface 44 that is then generally perpendicular to the central axis 36 of the rig body 30 and thus of the spacer 40, which channels 46 intersect and communicate with the radially-extending spacer arm slots 48 that are each generally in a plane parallel to the rig body central axis 36 and thus generally perpendicular to the respective spacer arm bent end channels 46. It will be appreciated that the bent ends 116 of the arms 110 are thus configured to be positioned within the respective spacer arm bent end channels 46 and are trapped therein by the support 80 when the rig body 30 is assembled, and specifically are secured between the respective channel 46 and the support upper surface 82 while each bent end 116 is still pivotable within the respective channel 46 and thus serves as a hinge for each arm 110 when the rig apparatus 20 is assembled. As also best seen in FIG. 4, each spacer arm slot 48 is formed having an angled slot stepped ramp 50 within the slot 48 opposite the respective spacer arm bent end channel 46, the ramp 50 serving to force a slight flex of the arm wire 112 as it is shifted from the splayed or extended first operational mode of FIG. 1 to the folded up second operational mode of FIG. 2, thereby providing a bit of resistance to the arms 110 collapsing or shifting away from the support 80 and the lower end 34 of the rig body 30 unintentionally. Whereas, when the arms 110 are to be shifted from their storage second operational mode back to the extended first operational mode for use of the apparatus 20 as they are folded down the arm wires 112 will again flex slightly as they travel the respective ramps 50 until each comes off the ramp 50 and somewhat snaps into place beneath the ramp 50 within the slot 48 with a portion of the arm wire 112 again abutting the support 80, and the support upper surface 82 specifically, whereas at all times the arm bent end 116 is retained but is pivotal within the respective spacer arm bent end channel 46 so as to facilitate such selective hinged or pivotal movement of each arm 110 relative to the rig body 30 as herein shown and described, again without any assembly or disassembly required or any risk of the arms 110 detaching. Those skilled in the art will appreciate that the width and depth of each spacer arm bent end channel 46 and the width of each spacer arm slot 48 including its stepped ramp 50 are sized according to the diameter of the arm wire 112 and that such features may be scaled up or down or such geometries and dimensions and related configurations adjusted depending on the context or the overall design and sizing and related purpose or intended use of such an umbrella fishing rig apparatus 20 and thus that such configurations and details may vary without departing from the spirit and scope of the invention.

Figure 5:
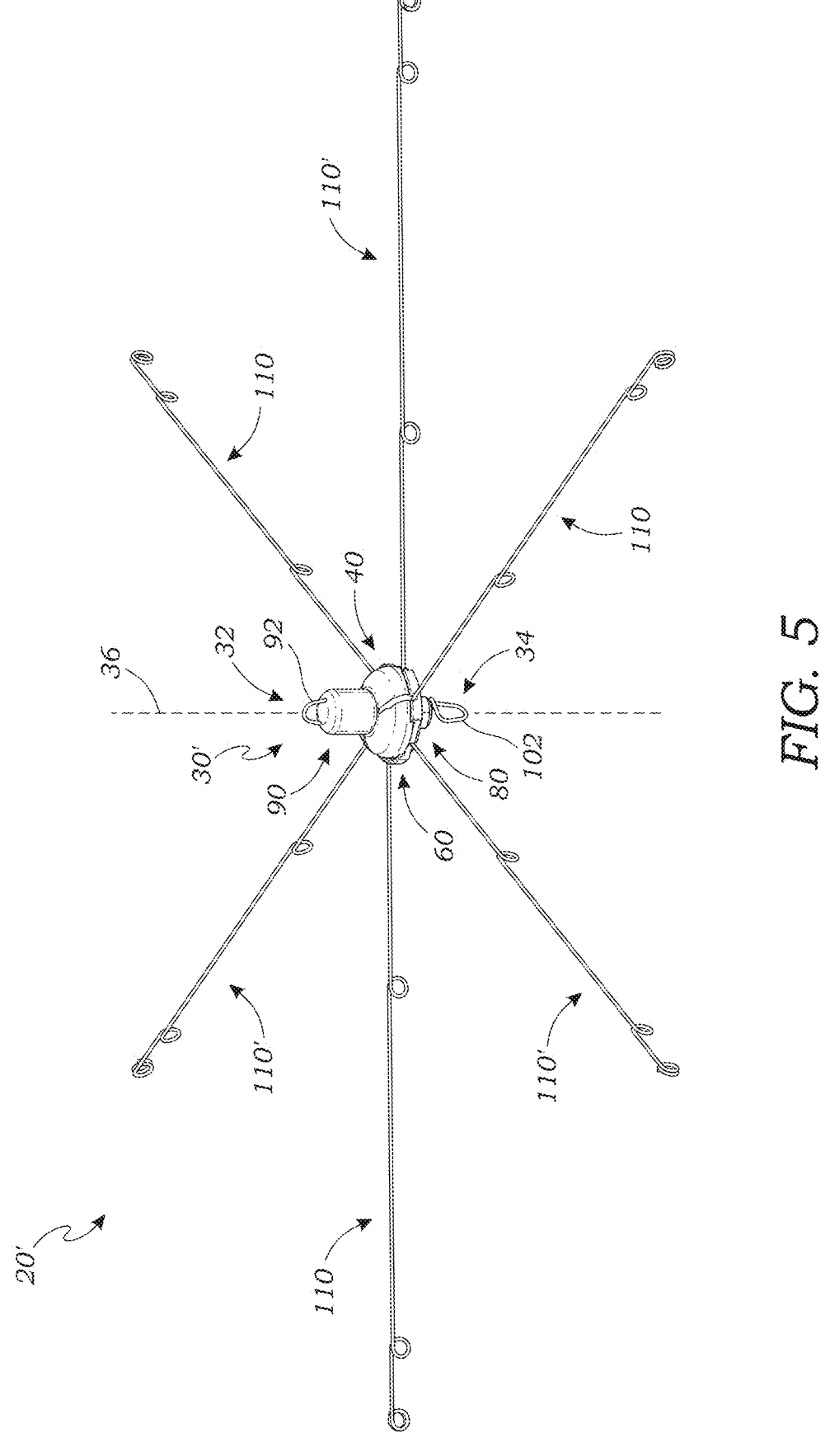
FIG. 5 is a perspective view of a further exemplary umbrella fishing rig apparatus in a first operational mode, in accordance with at least one embodiment.
Figure 6:
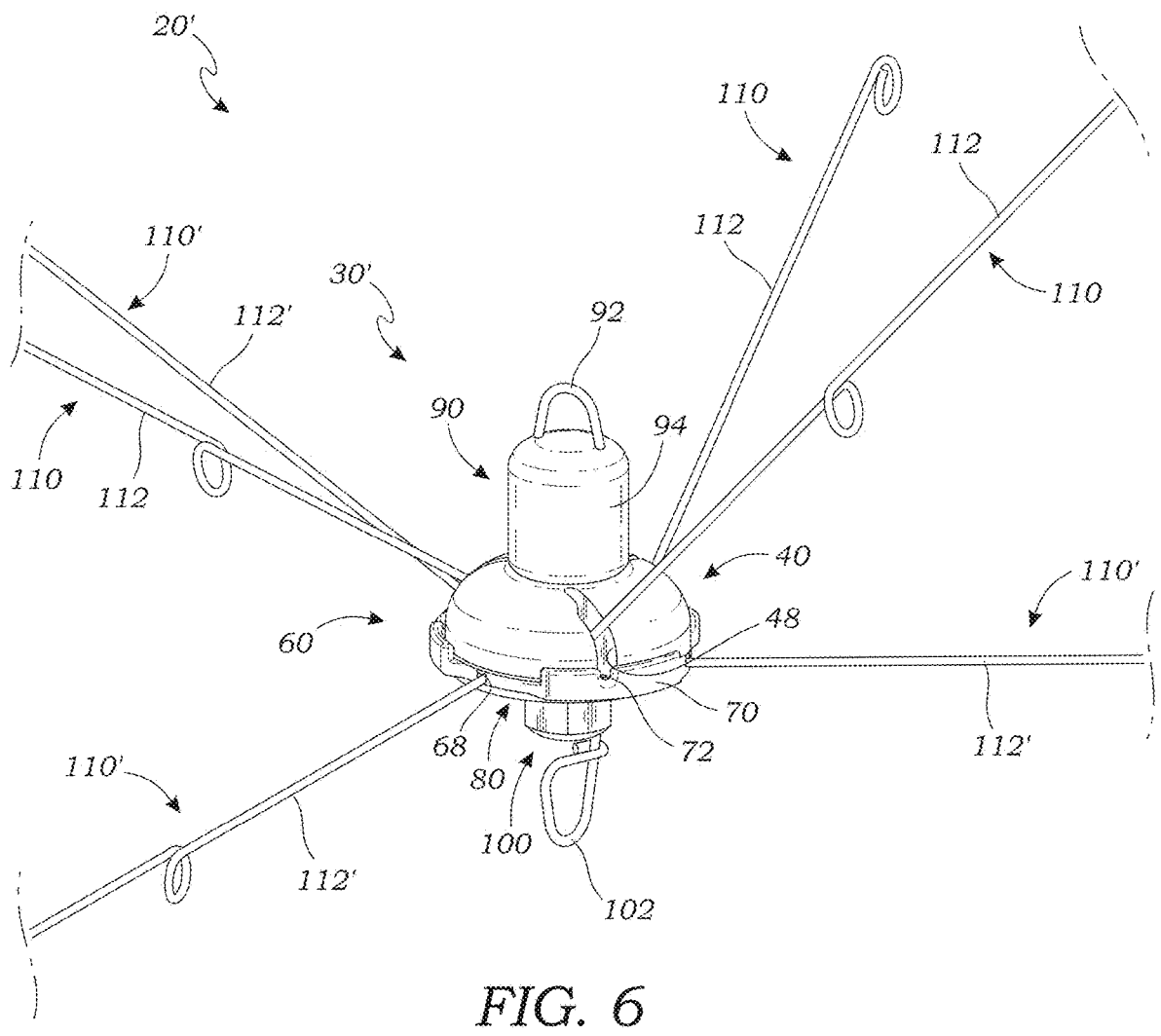
FIG. 6 is an enlarged partial perspective view thereof in a first intermediate mode, in accordance with at least one embodiment.
Figure 7:
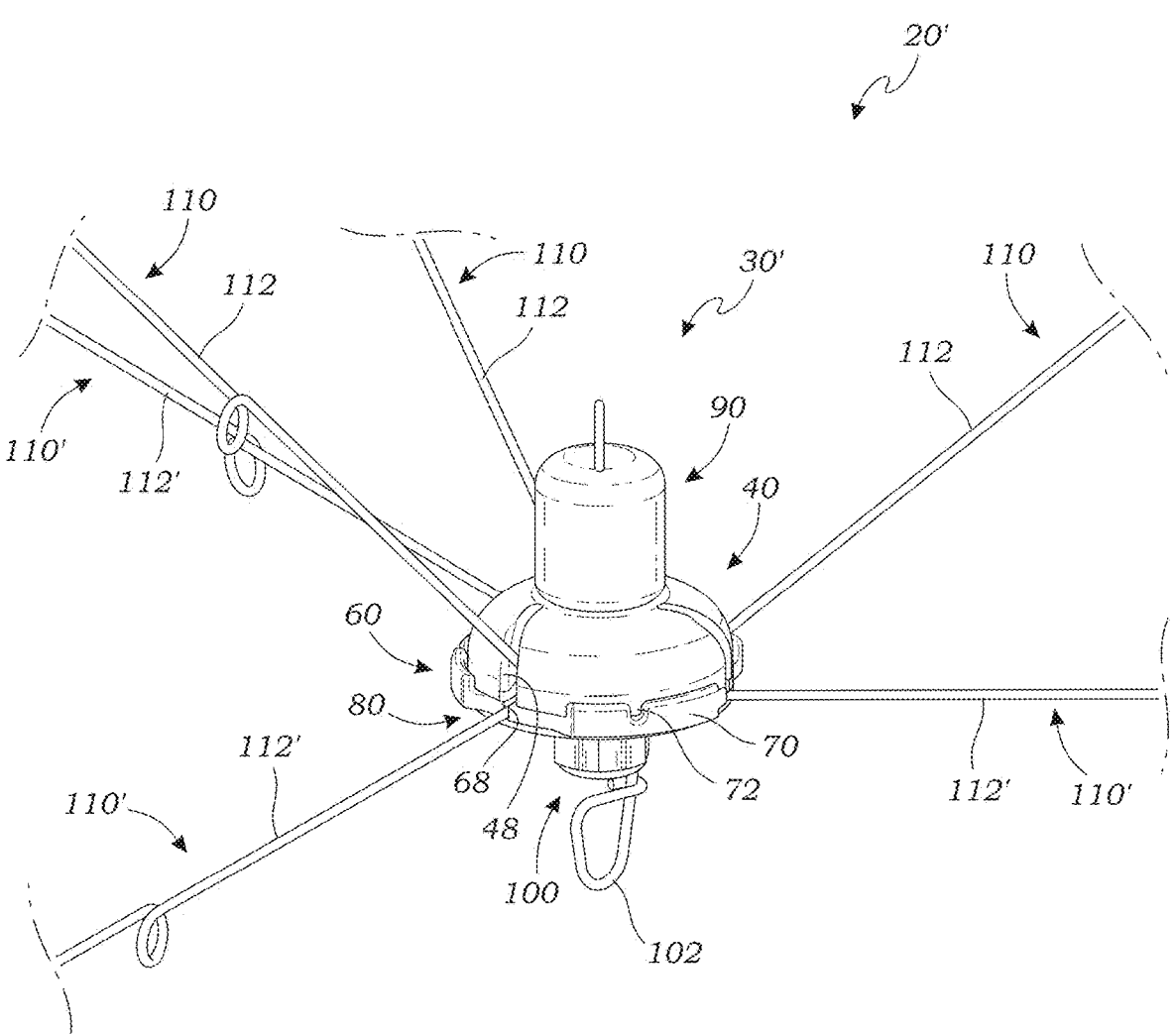
FIG. 7 is an enlarged partial perspective view thereof in a second intermediate mode, in accordance with at least one embodiment.
Figure 8:
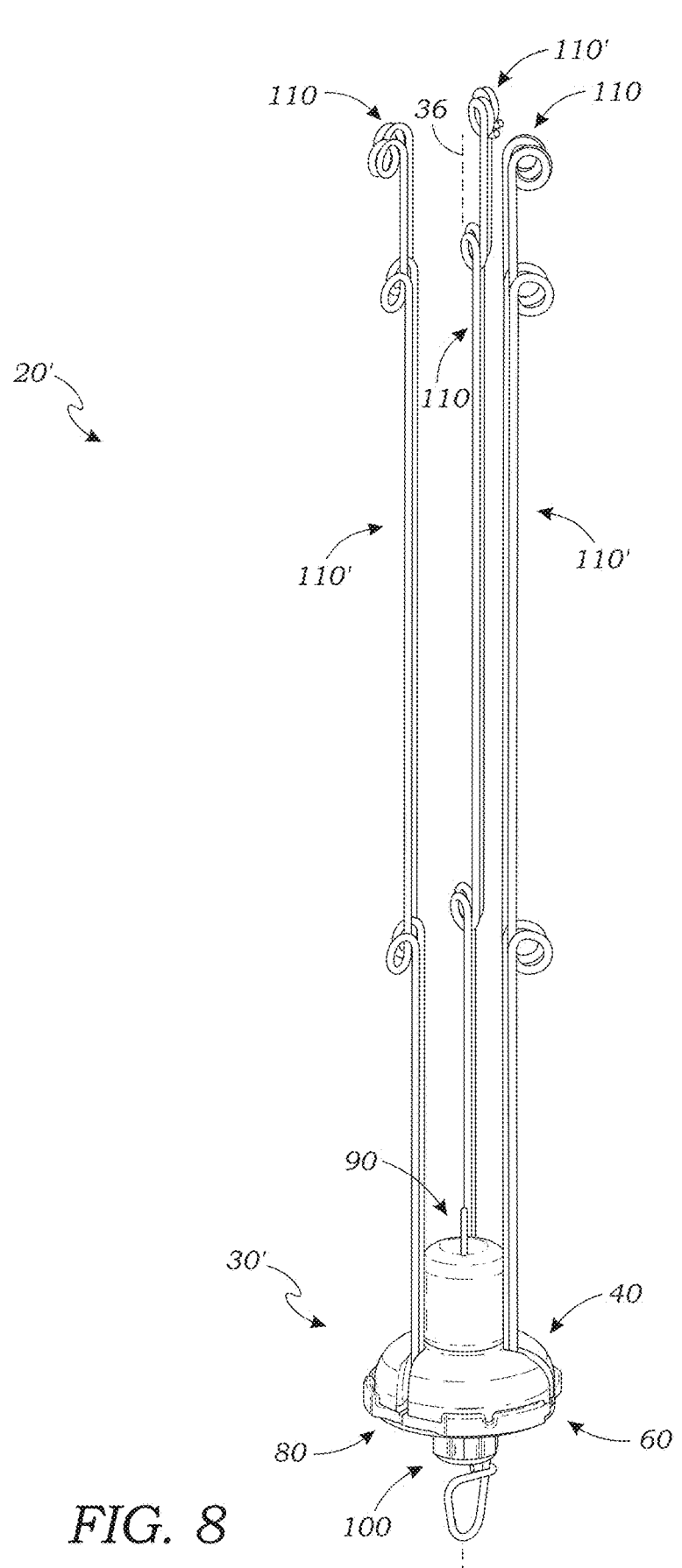
FIG. 8 is an enlarged perspective view thereof in a second operational mode, in accordance with at least one embodiment.

Turning now to FIGS. 5-8 there are shown perspective views of an alternative exemplary embodiment of an umbrella fishing rig apparatus 20' according to aspects of the present invention here having six arms 110, 110' rather than three, though it will be appreciated that the basic principles of construction and operation of the apparatus 20' remain. Particularly, such apparatus 20' again comprises a central rig body 30' and a plurality of elongate arms 110, 110' extending from the rig body 30' in a splayed arrangement, with each of the six arms 110, 110' once more configured to be selectively shiftable or pivotable between a somewhat radially-outwardly extending position as for use of the apparatus 20' in a first operational mode as shown in FIG. 5 and a somewhat axial or axially-aligned position as for storage of the apparatus 20' in a second operational mode as shown in FIG. 8, with two intermediate modes illustrated in FIGS. 6 and 7. The rig body 30' once again comprises the upper spacer 40 and lower support 80 but here also an intermediate stacker 60 positioned between the spacer 40 and support 80, with an exemplary bolt 90 and nut 100 holding the spacer 40, stacker 60, and support 80 in place and thus assembling the rig apparatus 20' as shown with its six arms 110, 110' operably retained within the rig body 30', more about which is said below in connection with FIGS. 9-11. Notably and particularly, in the exemplary six-arm umbrella fishing rig apparatus 20', a first set of three arms 110 is operably installed in or pivotally retained by the spacer 40 analogous to the three-arm version, though below by the stacker 60 instead of the support 80, and a second set of three arms 110' is operably installed or pivotally retained between the stacker 60 and the support 80, with the respective sets of upper and lower arms 110, 110' thus being out of plane or offset from each other when in the extended or folded-out position. The central axis 36 of the rig body 30' again passes substantially centrally through the bolt 90, spacer 40, stacker 60, support 80, and nut 100, and splayed about the central axis 36 and oriented again somewhat radially-outwardly are radially spaced-apart arm slots 48 formed in the spacer 40 from which the three upper arms 110 extend and through which the upper arms 110 are selectively shiftable or pivotable, here with the upper arms 110 further secured when in the extended or folded-out position within radially spaced-apart upwardly-opening notches 72 in an upwardly-extending perimeter lip 70 formed partially or in segments about the perimeter of the stacker 60. Likewise, splayed about the central axis 36 and oriented again somewhat radially-outwardly are radially spaced-apart arm slots 68 formed in the stacker 60 from which the three lower arms 110' extend when such lower arms 110' are selectively shifted or pivoted to the extended or folded-out position for use in the first operational mode of the 6-arm apparatus 20' as shown in FIG. 5. Thus, in the illustrated alternate embodiment of such an umbrella fishing rig apparatus 20' having six arms 110, 110', an upper three arms 110 again retained between the spacer 40 and the stacker 60 and a lower three arms 110' again retained between the stacker 60 and the support 80, it will be appreciated that the arms 110, 110' and any related features such as the spacer arm slots 48 and the stacker perimeter lip notches 72 relative to the upper arms 110 and the stacker arm slots 68 relative to the lower arms 110' are thus radially spaced or angularly offset from one another about the spacer 40 and stacker 60 by approximately one hundred twenty degrees (120°), though again other numbers of arms 110, 110' and angular offsets of any such features of an umbrella fishing rig apparatus 20, 20' according to aspects of the present invention may vary. Indeed, the exemplary 3-arm and 6-arm umbrella fishing rig apparatuses 20, 20' are merely illustrative and non-limiting and a variety of configurations, including but not limited to 2-arm, 4-arm, 5-arm, 7-arm, 8-arm, 9-arm, 10-arm, 11-arm, and 12-arm, and related spacing of such features are possible according to aspects of the present invention without departing from its spirit and scope. Moreover, while in the exemplary 3-arm umbrella fishing rig apparatus 20 of FIGS. 1-3 and the exemplary 6-arm umbrella fishing rig apparatus 20' of FIGS. 5-11 the arms 110, 110' are shown as being the same about the rig apparatus 20, 20' such is not necessarily the case, and one or more arms 110, 110' can vary or any combination of arm 110, 110' configurations in terms of their length and number and location of eyes 114, 118 can be employed on an umbrella fishing rig apparatus 20, 20' according to aspects of the present invention. Those skilled in the art will appreciate that when the arms 110, 110' of whatever kind or configuration are in their extended position for use as shown in FIG. 5 the upper set of three arms 110 in the exemplary 6-arm embodiment are shifted downwardly and outwardly through the respective spacer arm slots 48 so as to abut and be retained within the stacker perimeter lip notches 72 while the lower set of three arms 110' when shifted downwardly and outwardly are retained within respective stacker arm slots 68 analogous to the spacer arm slots 48 such that each lower arm 110' abuts the support 80 at the base of the respective stacker arm slot 68 thus stabilizing the arms 110, 110' in their radially-outward positions and preventing further downward movement of the arms 110, 110' in the direction of the lower end 34 of the rig body 30' during use. And then when the apparatus 20' is no longer in use and is to be configured for storage, as shown in FIG. 6 illustrating a first intermediate mode, the upper arms 110 are first simply shifted or pivoted upwardly within the respective spacer arm slots 48 away from the stacker 60 and the lower end 34 of the rig body 30', and specifically the stacker perimeter lip notches 72, and in the direction of the bolt head 94 at the upper end 32 of the rig body 30', whether to some intermediate location or angle as shown or fully up into a somewhat radially-offset axial arrangement spaced about the spacer 40 generally parallel to each other and the central axis 36 of the rig body 30', either way such upper arms 110 and specifically wires 112 no longer being positioned in and thus free of the stacker perimeter lip notches 72. In such configuration and now with reference to FIG. 7 illustrating a second intermediate mode, the spacer 40 and its three upper arms 110 can then be rotated relative to the stacker 60 and its three lower arms 110' until the spacer and stacker arm slots 48, 68 and thus the upper and lower arms 110, 110' are substantially aligned radially, whereby now as shown in FIG. 8 the lower arms 110' can also be pivoted upwardly out of the stacker arm slot 68 and into and through the respective spacer arm slot 48 until all the arms 110, 110' are brought into a somewhat radially-offset axial arrangement spaced about the spacer 40 generally parallel to each other and the central axis 36 of the rig body 30', which again renders the apparatus 20' much smaller than in its expanded configuration in terms of its overall profile or "foot print" for convenience in storage, even with six arms as illustrated here, the respective pairs of upper and lower arms 110, 110' beneficially being parallel and adjacent for further compactness of the rig apparatus 20' in its collapsed configuration. And to reconfigure the rig apparatus 20' for use the arms 110, 110' are once again simply folded down toward the lower end 34 of the rig body 30' as by first pivoting each of the lower arms 110' out away from the central axis 36 through the spacer arm slot 48 until it again seats within the stacker arm slot 68 abutting the support 80 at the bottom of the respective stacker arm slot 68 as shown in FIG. 7, the spacer 40 is then rotated relative to the stacker 60 until the spacer arm slots 48 and thus the upper arms 110 are substantially aligned with the respective stacker perimeter lip notches 72 as shown in FIG. 6, and each of the upper arms 110 is then rotated down and outwardly until it seats within the respective stacker perimeter lip notch 72 as shown in FIG. 5. Those skilled in the art will appreciate that the depth of each stacker arm slot 68 preferably corresponds to the diameter of the arm wire 112' such that once the lower arms 110' are in position within the stacker arm slots 68 as shown in FIG. 7 the upper arms 110 cannot also fit within the stacker arm slots 68 and so must remain paired with the spacer 40 and rotate therewith for alignment with the respective stacker perimeter lip notches 72 as shown in FIG. 6. As such there is only one way the rig apparatus 20' can be opened and closed between its storage and use configurations, which is intuitive and again accomplished without the use of any tools or unscrewing any fasteners, unclamping any mechanisms, or the like or of course any disassembly of the apparatus 20' or any detachment of the arms 110, 110' even as the exemplary 6-arm umbrella fishing rig apparatus 20' according to aspects of the invention is conveniently manually shifted between its storage and use configurations or operational modes. In the exemplary 6-arm rig apparatus 20', it will be further appreciated that with both the upper arms 110 and the lower arms 110' being radially spaced or angularly offset from one another about the respective spacer 40 and stacker 60 by approximately one hundred twenty degrees (120°) and the spacer 40 indexed relative to the stacker 60 to position the upper arms 110 and lower arms 110' substantially between one another in the first operational mode for use as shown in FIG. 5, it follows that all such arms 110, 110' are thus radially spaced or angularly offset from one another by approximately sixty degrees (60°), even if not in the same plane or being offset vertically, providing for nice uniform spacing of the arms 110, 110' and any bait thereon (not shown) about the rig apparatus 20' in use. As such, those skilled in the art will again appreciate that such an umbrella fishing rig apparatus 20' has numerous advantages in construction and use.

Figure 9:
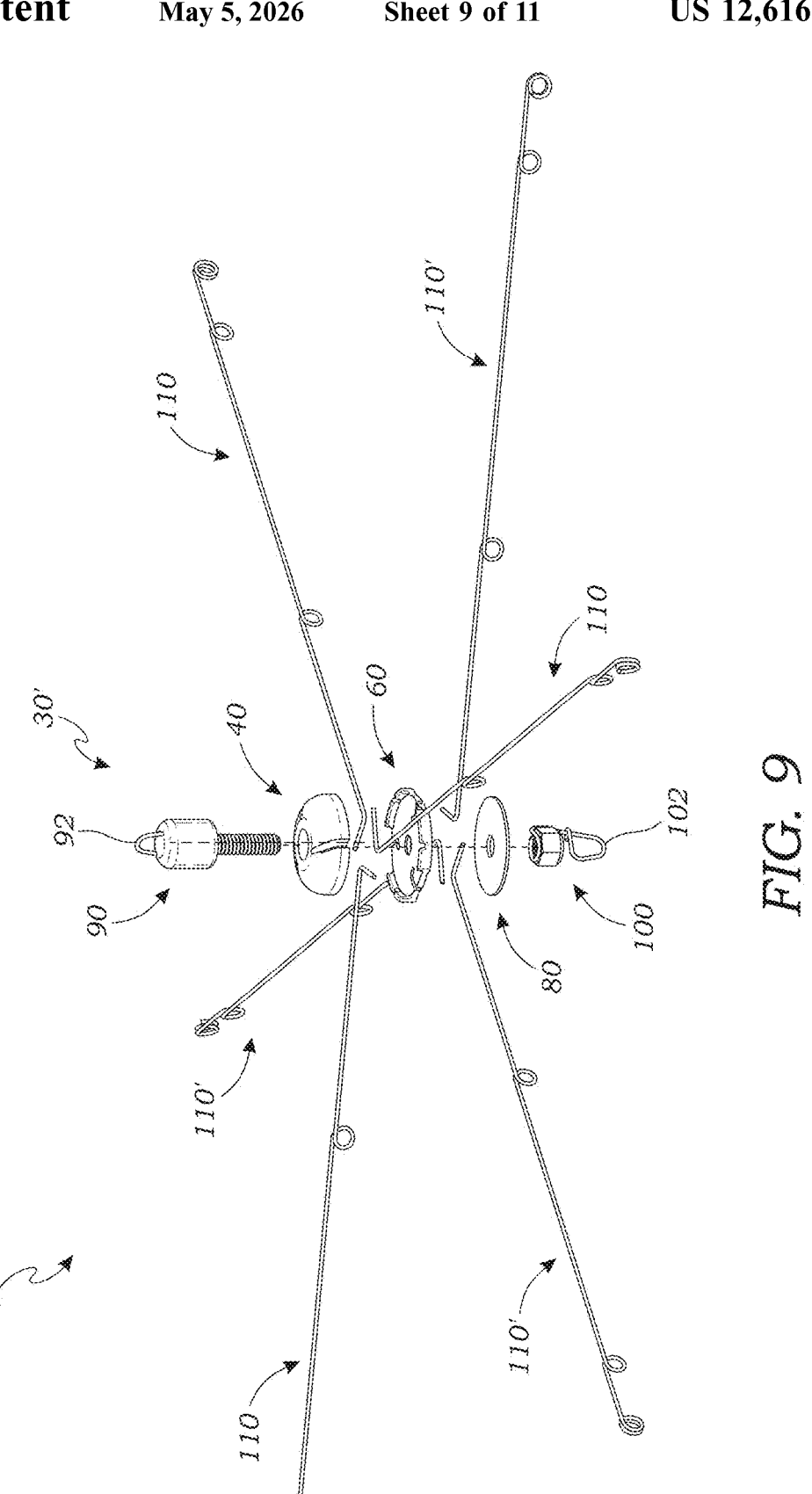
FIG. 9 is an exploded perspective view thereof, in accordance with at least one embodiment.
Figure 10:
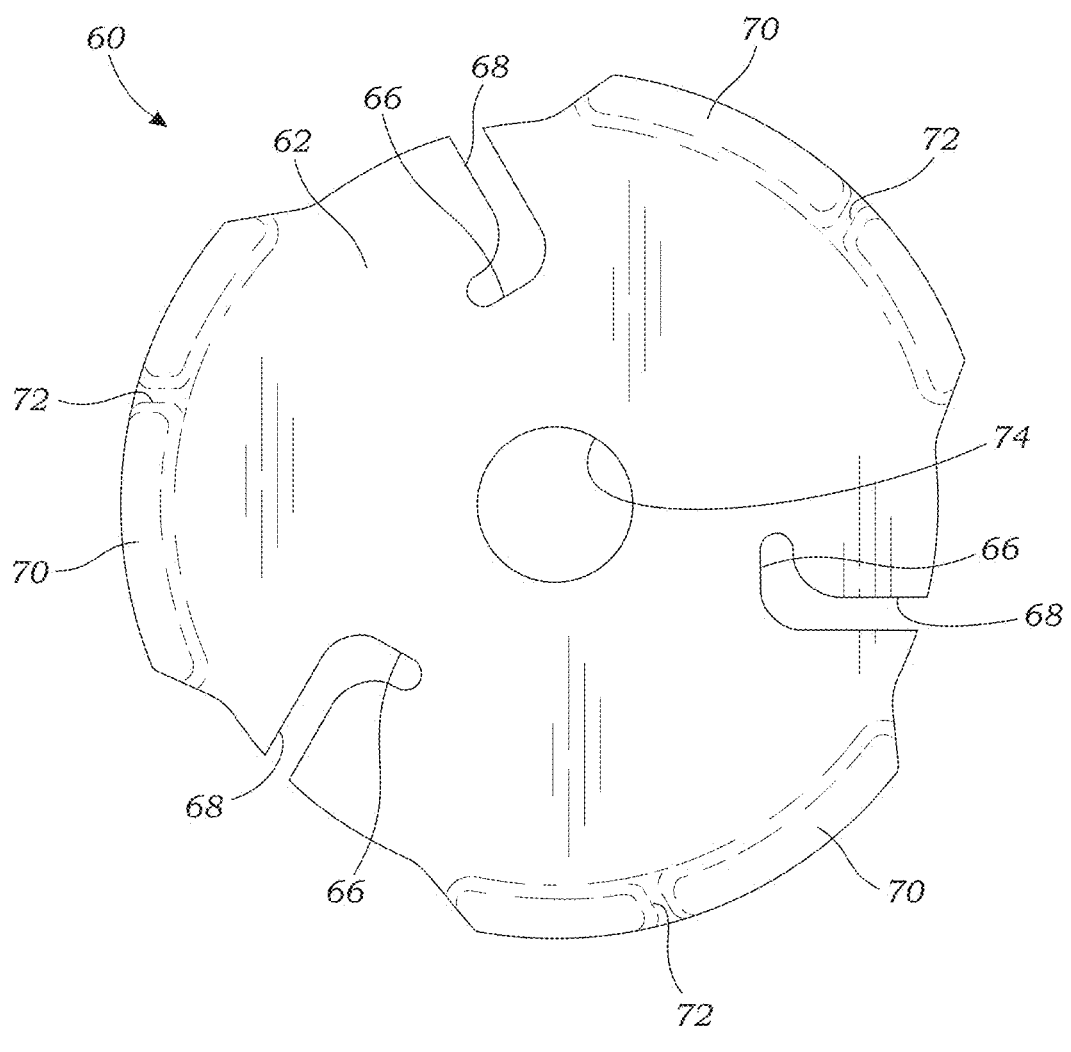
FIG. 10 is an enlarged top view of the stacker thereof, in accordance with at least one embodiment.
Figure 11:
FIG. 11 is an enlarged exploded partial perspective view thereof, in accordance with at least one embodiment.

Finally, referring to FIGS. 9-11, it can be seen once again that the alternative 5 exemplary rig body 30' of the umbrella fishing rig apparatus 20' according to aspects of the present invention includes an upper spacer 40, an intermediate stacker 60, and a lower support 80 that in this illustrative embodiment are again held together via a bolt 90 and related nut 100 threadably engaged on the shaft 96 of the bolt 90 so as to operably assemble the rig body 30' with the splayed arms 110, 110' pivotally secured within the rig body 30' as shown in FIGS. 5-8. The spacer 40 and support 80 are in this example the same as those of the 3-arm umbrella fishing rig apparatus 20 of FIGS. 1-4 and so the spacer 40 again has an upper surface 42 and an opposite lower surface 44 and a spacer through-hole 54 communicating therebetween and similarly the support 80 has an upper surface 82 and an opposite lower surface 84 and a support through-hole 86 communicating therebetween. Furthermore, the stacker 60 located between the spacer 40 and the support 80 also has an upper surface 62 and an opposite lower surface 64 and a stacker through-hole 74 communicating therebetween, so as to allow for passage of the bolt shaft 96 through the spacer 40, the stacker 60, and the support 80 via the respective through-holes 54, 74, 86, though it will be appreciated once more that a variety of other fasteners or fastening means for assembling the spacer 40, stacker 60, and support 80 together in forming the rig body 30' so as to operably retain the legs 110, 110' thereon are possible according to aspects of the present invention without departing from its spirit and scope, whether now known or later developed, such that the threaded bolt 90 and nut 100 and related spacer, stacker, and support through-holes 54, 74, 86 and other such features of the spacer 40, stacker 60, and support 80 accommodating the bolt 90 and nut 100 are to be understood as illustrative and non-limiting. Once more, each radially-extending spacer arm slot 48 intersects and communicates between the spacer upper and lower surfaces 42, 44 so as to allow for the full range of motion of the upper arms 110 as shown and described in connection with FIGS. 5-8. As best seen in FIG. 10, the stacker 60 again has an outer upwardly-extending perimeter lip 70 formed partially or in segments about the perimeter of the stacker 60 on its upper surface 62 with the radially spaced-apart upwardly-opening notches 72 formed in the lip 70 and further has both the central through-hole 74 and the radially spaced or angularly offset stacker arm slots 68 communicating between the upper and lower surfaces 62, 64 of the stacker 60. Each exemplary arm 110, 110' as best seen in FIG. 11 is again generally configured as or formed from an elongate wire 112, 112' having at least a terminal eye 114, 114' at its free end and optionally one or more intermediate eye 118, 118' each for selectively attaching bait (not shown) to the arm 110, 110' and most notably further having an opposite bent end 116, 116' that is configured for operable, pivotal or hinged engagement within the rig body 30', here between the spacer 40 and the stacker 60 for the upper arms 110, specifically within the spacer arm bent end channels 46, and between the stacker 60 and the support 80 for the lower arms 110', specifically within the stacker arm bent end channels 66. Particularly, as shown in FIG. 11, the lower surface 64 of the stacker 60 is further formed having radially-offset stacker arm bent end channels 66 that are generally in the plane of the lower surface 64 that is once again then generally perpendicular to the central axis 36 of the rig body 30' and thus of the spacer 40 and the stacker 60, which channels 66 intersect and communicate with the radially-extending stacker arm slots 68 that are here also generally in a plane perpendicular to the rig body central axis 36 and thus generally in the same plane through the stacker 60 as the respective stacker arm bent end channels 66, thus forming generally L-shaped spaces within the stacker 60 for operable receipt and pivotal movement of the lower arms 110'. Particularly, it is noted with reference to both FIGS. 10 and 11 that each stacker arm bent end channel 66 partially communicates between the stacker upper and lower surfaces 62, 64 or basically intersects the upper and lower surfaces 62, 64 toward the respective stacker arm slot 68 but not along the full length of the respective channel 66, which it will be appreciated allows for retention of the respective bent end 116' of each lower arm 110' within the respective stacker arm bent end channel 66 and for pivoting of the lower arm 110' about the bent end 116' as by passage of the respective lower arm wire 112' through the associated stacker arm slot 68. It will be appreciated that the bent ends 116' of the lower arms 110' are thus configured to be positioned within the respective stacker arm bent end channels 66 and are trapped therein by the support 80 while the bent ends 116 of the upper arms 110 are again configured to be positioned within the respective spacer arm bent end channels 46 and are trapped therein here by the upper surface 62 of the stacker 60 when the rig body 30' is assembled. Specifically, as best seen in FIG. 10, the upwardly-opening perimeter lip notches 72 within which the upper arm wires 112 selectively seat are radially spaced or angularly offset from the stacker arm bent end channels 66 and stacker arm slots 68 such that location and operation of the upper arms 110 is selectively radially spaced from the lower arms 110' and in any case the upper arm bent ends 116 are able to at all times operate against and along the substantially planar stacker upper surface 62 for retention of such bent ends 116 within the respective spacer arm bent end channels 46. It will therefore be appreciated that the upper and lower arms 110, 110' in the alternative exemplary 6-arm rig apparatus 20' and particularly the bent ends 116, 116' are in two different parallel planes within the rig body 30' or offset planes both perpendicular to the central axis 36 of the rig body 30' further contributing to the splaying of such arms 110, 110' in use as in FIG. 5 and the stacking of pairs of such arms 110, 110' when collapsed for storage as in FIG. 8, again without any assembly or disassembly required or any risk of the arms 110, 110' detaching. Those skilled in the art will once more appreciate that the width and depth of each spacer and stacker arm bent end channel 46, 66 and the width of each spacer and stacker arm slot 48, 68 including any stepped ramp 50 as well as the height of the stacker perimeter lip 70 and the width or diameter of each stacker perimeter lip notch 72 are all essentially sized according to the diameter of the arm wire 112, 112' and that regardless such features may be scaled up or down or such geometries and dimensions and related configurations adjusted depending on the context or the overall design and sizing and related purpose or intended use of any such umbrella fishing rig apparatus 20' and thus that such configurations and details may vary without departing from the spirit and scope of the invention.

More generally, it will be appreciated by those skilled in the art that while the spacer 40, stacker 60, and support 80 are shown and described as being substantially planar, particularly as to their adjacent surfaces (i.e., the spacer lower surface 44, the stacker upper and lower surfaces 62, 64, and the support upper surface 82), and thus such features as being substantially parallel to each other and perpendicular to the rig body central axis 36, such is not necessarily the case. For example, the spacer lower surface 44, the stacker upper and lower surfaces 62, 64, and/or the support upper surface 82 could instead be frusto-conical, in whole or in part, such that when the arms 110 and/or 110' are pivoted down into their splayed in use positions rather than effectively extending directly radially outwardly in a substantially horizontal plane perpendicular to the vertical rig body axis 36, they would pivot past horizontal or at an angle below horizontal and thus at an angle other than ninety degrees to the rig body central axis 36. It will be further appreciated that such may be the case for one or both sets of arms 110, 110' (i.e., the upper set of arms 110, the lower set of arms 110', or both the upper and lower sets of arms 110, 110'), and even where both sets of arms 110, 110' in their splayed in use position are at an angle other than perpendicular to the rig body axis 36, they are not necessarily at the same angle, or even could be at different angles in the same set of arms 110, 110'. Ultimately, the possibilities for the angular positions of the arms 110, 110' in their splayed in use position or first operational mode are practically endless, such that those skilled in the art will appreciate that the illustrative configurations of an umbrella rig apparatus 20, 20' as having sets of arms 110, 110' in a common plane when in the splayed in use position that is substantially perpendicular to the rig body central axis 36 is merely illustrative of aspects of the present invention and non-limiting. Relatedly and specifically, then, while the support 80 is shown and described as a common flat washer, such is not necessarily so in keeping with the principles of the present invention. Furthermore, while the spacer arm bent end channels 46 and the stacker arm bent end channels 66 are shown and described as also being co-planar relative to each other (i.e., the spacer arm bent end channels 46 in a common plane and the stacker arm bent end channels 66 in a common plane), it will be appreciated that such is again not necessarily the case, as would follow from such channels 46, 66 being formed in a frusto-conical surface, for example. But even if such channels 46, 66 are formed in a planar surface, they may be at an angle in depth to such planar surface and so out-of-plane from such surface, with the related arms 110, 110' and their respective bent ends 116, 116' specifically still being operably and pivotably retained within such channels 46, 66 as by being held by appropriately configured adjacent surfaces or features, any and all of which being possible according to aspects of the present invention without departing from its spirit and scope. Once more, while in the exemplary embodiments of umbrella rig apparatuses 20, 20' herein substantially planar surfaces parallel to each other or at right angles to the rig body central axis 36 are shown and described, the invention is not so limited and a wide variety of configurations according to aspects of the present invention may instead be employed in particular contexts.

Advantageously from a manufacturing and cost standpoint, the same spacer 40, support 80, bolt 90, and nut 100 are used in the exemplary 3-arm and 6-arm umbrella fishing rig apparatuses 20, 20' according to aspects of the present invention, and in the exemplary embodiments even the arms 110, 110' are the same throughout, though again not necessarily. It will be appreciated more generally that any and all such components of the umbrella fishing rig apparatus 20, 20' may be formed of any suitable material, such as metal or plastic, through any suitable fabrication process, such as molding, casting, machining, additive manufacturing, stamping, or forming, whether now known or later developed. Particularly, in forming the spacer 40 and stacker 60 components of the rig body 30, 30', it will be appreciated that any appropriate materials and methods of construction now known or later developed may be employed, including but not limited to metals such as steel, aluminum, alloys, and the like and more preferably a variety of plastics or resins such as polypropylene, polystyrene, polyvinyl chloride ("PVC"), acrylonitrile butadiene styrene ("ABS"), polyethylenes such as high density polyethylene ("HDPE") and low density polyethylene ("LDPE"), polycarbonate, polyurethane, and other such plastics, thermoplastics, thermosetting polymers, and the like, any such components being fabricated or formed as through injection molding, casting, extrusion, machining, stamping, forming, 3-D printing or additive manufacturing, laser cutting or curing, or any other such technique now known or later developed. Relatedly, such components may be formed integrally or may be formed separately and then assembled in any appropriate secondary operation employing any assembly technique now known or later developed, including but not limited to fastening, bonding, welding, over-molding or coining, press-fitting, snapping, or any other such technique now known or later developed. While the support 80, bolt 90, and nut 100 may also be custom-formed, or again some other fastening means for the spacer 40 and/or stacker 60 and/or support 80 in forming the central rig body 30, 30', more preferably each of the support 80, bolt 90, and nut 100 and even any bolt loop 92 and nut loop 102 is an "off-the-shelf" item, which again has manufacturing and cost advantages. Those skilled in the art will fundamentally appreciate that any such materials and methods of construction are encompassed within the scope of the invention, any exemplary materials and methods in connection with any and all embodiments thus being illustrative and non-limiting. Dimensionally, the overall size and scale or proportionality of any such umbrella fishing rig apparatus 20, 20' may vary widely based on a number of factors and contexts—in the present exemplary 3-arm and 6-arm rigs the overall diameter of the rig body 30, 30' may range from roughly one-half inch to two inches (½-2 in.) and the length of the arms 110, 110' may be on the order of six to eighteen inches (6-18 in.), though again other sizes and shapes or configurations are possible according to aspects of the present invention.

In closing, regarding the exemplary embodiments of the present invention as shown and described herein, it will be appreciated that an umbrella fishing rig apparatus is disclosed and configured for reliable, convenient, and cost-effective operation in selectively collapsing the arms for efficient storage and transport and selectively extending the arms for use. Because the principles of the invention may be practiced in a number of configurations beyond those shown and described, it is to be understood that the invention is not in any way limited by the exemplary embodiments, but is generally able to take numerous forms in functioning as described without departing from the spirit and scope of the invention. It will also be appreciated by those skilled in the art that the present invention is not limited to any particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of components or ingredients, properties such as dimensions, weight, concentration, reaction conditions, and so forth, used to describe and claim certain embodiments of the inventive subject matter are to be understood as being modified in some instances by terms such as "about," "approximately," or "roughly." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in any specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with any appended claims here or in any patent application claiming the benefit hereof, and it is made clear that the inventor believes that the claimed subject matter is the invention.

What is claimed is:

1. An umbrella fishing rig apparatus comprising:

a rig body having an upper end and an opposite lower end and a central axis therethrough and comprising a spacer and a support, the spacer having a spacer upper surface and an opposite spacer lower surface, the spacer lower surface having formed therein radially spaced apart downwardly-opening spacer arm bent end channels communicating with radially spaced apart outwardly-opening spacer arm slots formed in the spacer intersecting the spacer upper and lower surfaces, and the support having a support upper surface and an opposite support lower surface wherein the spacer lower surface is in contact with either the support upper surface or a stacker upper surface so as to have no gap therebetween; and arms operably engaged with the rig body, each arm being elongate and formed having a proximal bent end configured to pivotally seat within the respective spacer arm bent end channel, wherein the arm bent ends and the spacer arm bent end channels are coextensive, wherein the spacer arm slots are parallel to the central axis, wherein in a first operational mode of the apparatus the arms are splayed radially outwardly from the rig body as extending from the respective spacer arm slots parallel to the spacer lower surface, wherein in a second operational mode of the apparatus the arms are shifted upwardly toward the rig body upper end through the respective spacer arm slots parallel to the rig body central axis, and wherein selectively shifting the apparatus between the first operational mode for use and the second operational mode for storage involves no tools, unscrewing any fasteners, or unclamping any mechanisms, or any disassembly of the apparatus.

2. The apparatus of claim 1 wherein each spacer arm slot is formed having a circumferentially inwardly protruding slot stepped ramp that the respective arm frictionally engages and flexes over in shifting between the first and second operational modes, wherein the arms are caused to latch open in the first operational mode.

3. The apparatus of claim 1 wherein in the first operational mode the arms are positioned in a first plane perpendicular to the rig body central axis.

4. The apparatus of claim 3 wherein the first plane is parallel to and offset from the spacer lower surface.

5. The apparatus of claim 3 wherein the support is formed as a flat washer and the support upper surface is planar and perpendicular to the rig body central axis, the arms resting on and supported by the support upper surface when in the first operational mode.

6. The apparatus of claim 3 wherein the arm bent ends and the spacer arm bent end channels are parallel to the first plane.

7. The apparatus of claim 3 wherein in the second operational mode the arms are positioned in second planes perpendicular to the spacer lower surface and the first plane.

8. The apparatus of claim 7 wherein the spacer arm slots are parallel to the second planes.

9. The apparatus of claim 1 wherein the arm bent ends are retained within the spacer arm bent end channels by the support upper surface.

10. The apparatus of claim 1 wherein the arms rest on and are supported by the support upper surface when in the first operational mode.

11. The apparatus of claim 1 wherein:

the rig body further comprises a stacker positioned between the spacer and the support, the stacker having the stacker upper surface and an opposite stacker lower surface, the stacker lower surface having formed thereon radially spaced apart downwardly-opening stacker arm bent end channels communicating with radially spaced apart outwardly-opening stacker arm slots formed in the stacker intersecting the stacker upper and lower surfaces; and the arms having their proximal bent ends configured to pivotally seat within the respective spacer arm bent end channels define a first set of arms, and the arms operably engaged with the rig body further comprise a second set of arms with their proximal bent ends configured to pivotally seat within the respective stacker arm bent end channels, the first and second sets of arms being vertically offset, wherein in the first operational mode of the apparatus the first set of arms are splayed radially outwardly from the rig body as extending from the respective spacer arm slots parallel to the spacer lower surface and the second set of arms are splayed radially outwardly from the rig body as extending from the respective stacker arm slots parallel to the stacker lower surface, the first and second sets of arms being radially offset, wherein in the second operational mode of the apparatus the first set of arms are shifted upwardly toward the rig body upper end through the respective spacer arm slots parallel to the rig body central axis, the spacer is rotated relative to the stacker to radially align the second set of arms with the spacer arm slots, and the second set of arms are shifted upwardly toward the rig body upper end through the respective spacer arm slots parallel to the rig body central axis and to the first set of arms.

12. The apparatus of claim 11 wherein in the first operational mode the first and second sets of arms are positioned in first planes perpendicular to the rig body central axis.

13. The apparatus of claim 12 wherein the first planes are parallel to and offset from the spacer and stacker lower surfaces.

14. The apparatus of claim 12 wherein the stacker upper surface is planar and perpendicular to the rig body central axis, the first set of arms resting on and supported by the stacker upper surface when in the first operational mode.

15. The apparatus of claim 12 wherein the support is formed as a flat washer and the support upper surface is planar and perpendicular to the rig body central axis, the second set of arms resting on and supported by the support upper surface when in the first operational mode.

16. The apparatus of claim 12 wherein the arm bent ends and the spacer and stacker arm bent end channels are parallel to the first planes.

17. The apparatus of claim 12 wherein in the second operational mode the first and second sets of arms are positioned in second planes perpendicular to the spacer lower surface and the first planes.

18. The apparatus of claim 17 wherein the spacer and stacker arm slots are parallel to the second planes.

19. The apparatus of claim 11 wherein the arm bent ends of the first set of arms are retained within the spacer arm bent end channels by the stacker upper surface and the arm bent ends of the second set of arms are retained within the stacker arm bent end channels by the support upper surface.

20. The apparatus of claim 11 wherein the first set of arms rest on and are supported by the stacker upper surface and the second set of arms rest on and are supported by the support upper surface when in the first operational mode.

21. The apparatus of claim 20 wherein the stacker is formed on the stacker upper surface with an intermittent upwardly-oriented perimeter lip having radially spaced-apart upwardly-opening notches configured for receiving the first set of arms in the first operational mode.

*   *   *   *   *